United States Patent
Nakajima

(10) Patent No.: US 8,321,920 B2
(45) Date of Patent: Nov. 27, 2012

(54) IMAGE FORMING SYSTEM AND IMAGE FORMING APPARATUS

(75) Inventor: Kouki Nakajima, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 964 days.

(21) Appl. No.: 12/350,668

(22) Filed: Jan. 8, 2009

(65) Prior Publication Data
US 2009/0260069 A1    Oct. 15, 2009

(30) Foreign Application Priority Data
Apr. 10, 2008  (JP) ................................. 2008-102077

(51) Int. Cl.
H04L 29/06  (2006.01)
(52) U.S. Cl. .............................. 726/7; 358/1.15; 726/31
(58) Field of Classification Search ................ 726/7, 31; 700/275; 727/7
See application file for complete search history.

(56) References Cited

U.S. PATENT DOCUMENTS

| 7,760,382 B2* | 7/2010 | Murata ......................... 358/1.15 |
| 2006/0256370 A1* | 11/2006 | Murakawa ................... 358/1.15 |
| 2007/0035767 A1 | 2/2007 | Numata | |

FOREIGN PATENT DOCUMENTS

| JP | 2003-204412 | 7/2003 |
| JP | 2003330686 | 11/2003 |
| JP | 2004021155 | 1/2004 |
| JP | 2004-242116 | 8/2004 |
| JP | 2005078165 | 3/2005 |
| JP | 200747982 | 2/2007 |

* cited by examiner

Primary Examiner — Jung Kim
Assistant Examiner — Ghodrat Jamshidi
(74) Attorney, Agent, or Firm — K&L Gates LLP

(57) ABSTRACT

An image forming system comprising: a server device including user information, for performing a user authentication via a computer network and for receiving and adding up count data on a user basis; and an image forming apparatus including: a storage unit to which a data area for storing therein the count data including a count value of an occurrence of a predetermined event can be allocated; a login processing unit for determining whether or not to permit a user to log in; a count unit for updating, when the predetermined event occurs based on an operation performed by the user permitted to log in, the count data for the user; and a transmission unit for transmitting, when the user logs out, the count data for the user to the server device.

20 Claims, 2 Drawing Sheets

IMAGE FORMING SYSTEM AND IMAGE FORMING APPARATUS

INCORPORATION BY REFERENCE

This application is based upon and claims the benefit of priority from the corresponding Japanese Patent Application No. 2008-102077, filed Apr. 10, 2008, the entire contents of which is incorporated herein by reference.

BACKGROUND

1. Field of the Invention

The present invention relates to an image forming system and an image forming apparatus.

2. Description of the Related Art

Image forming apparatuses are known that detect when a process such as printing or copying is performed, that such an event has occurred and count the number of prints, copies, or the like. With such an image forming apparatus, it is possible to manage count values such as the number of prints and/or copies on an intracompany department basis.

More recently, image forming apparatuses are often used by being connected to computer networks. Some computer networks, in which a plurality of users use a plurality of terminal devices, are provided with an authentication server for performing a user authentication. The authentication server has user information registered in advance, and performs an authentication process with respect to users who operate the terminal device based on the user information.

The count values are generally stored in the image forming apparatus. The count values are typically sent to a server. If the count value does not reach a server device due to a communication fault that has occurred in the computer network or other such cause, the count values cannot be summed up correctly, which makes it difficult to centrally manage the count values using the server device.

If the count values are to be managed on an intracompany department basis, storing the count values in individual image forming apparatuses makes it difficult to centrally manage the count values by a server such as the above-mentioned authentication server in association with the user information.

SUMMARY

The present invention provides image forming systems, apparatuses and methods which are capable of centrally managing count data using a server device in association with user information.

Accordingly, in an embodiment of the present invention, there is provided an image forming system comprising: a server device including user information, for performing a user authentication via a computer network and for receiving and summing up count data on a user basis; and an image forming apparatus including: a storage unit to which a data area for storing therein the count data including a count value of an occurrence of a predetermined event can be allocated; a login processing unit for determining whether or not to permit a user to log in; a count unit for updating, when the predetermined event occurs based on an operation performed by a user that was permitted to log in, the count data for the user; and a transmission unit for transmitting, when the user permitted to log in logs out, the count data for the user to the server device.

According to an another embodiment of the present invention, there is provided an image forming system, comprising: a first server device including user information, for performing a user authentication via a computer network; a second server device for receiving and summing up count data on a user basis; and an image forming apparatus including: a storage unit to which a data area for storing therein the count data including a count value of an occurrence of a predetermined event can be allocated; a login processing unit for determining whether or not to permit a user to log in; a count unit for updating, when the predetermined event occurs based on an operation performed by a user that was permitted to log in, the count data for the user; and a transmission unit for transmitting, when the user permitted to log in logs out, the count data for the user to the second server device.

According to yet another embodiment of the present invention, there is provided an image forming apparatus, which transmits count data to a server device for managing the count data including a count value of an occurrence of a predetermined event, comprising: a storage unit to which a data area for storing therein the count data including the count value of the occurrence of the predetermined event can be allocated; a login processing unit for determining whether or not to permit a user to log in; a count unit for updating, when the predetermined event occurs based on an operation performed by a user that was permitted to log in, the count data for the user; and a transmission unit for transmitting, when the user permitted to log in logs out, the count data for the user to the server device.

Additional features and advantages are described herein, and will be apparent from the following Detailed Description and the figures.

DETAILED DESCRIPTION

Hereinafter, description is made of an embodiment of the present invention based on the accompanying drawings.

Figure 1:
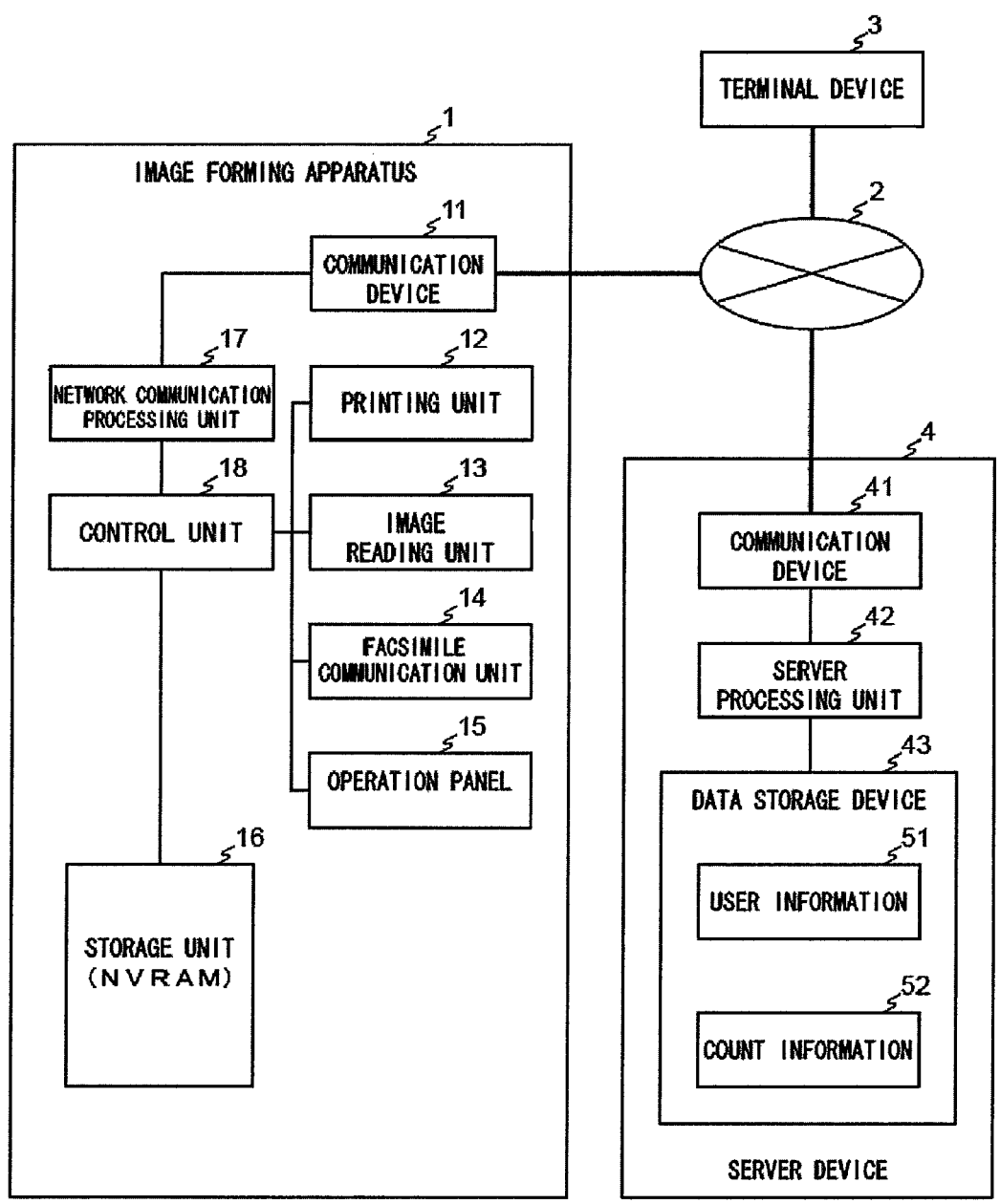
FIG. 1 is a block diagram illustrating a configuration of an image forming system according to an embodiment of the present invention.

FIG. 1 is a block diagram illustrating a configuration of an image forming system according to an embodiment of the present invention.

In the image forming system illustrated in FIG. 1, an image forming apparatus 1 is connected to a computer network 2. The apparatus 1 can be used by a user who operates a terminal device 3 connected to the computer network 2 or through an operation panel 15 of the image forming apparatus 1. The user who operates the image forming apparatus 1 is subjected to a user authentication conducted by a server device 4. The server device 4 has user information 51 with respect to authorized users registered thereon, and uses the authentication information to verify potential users of the apparatus.

Examples of the image forming apparatus 1 include a multi-function peripheral (MFP), a printer, a copier, and a facsimile communication device. Examples of the terminal device 3 include a personal computer.

The image forming apparatus 1 includes a communication device 11, a printing unit 12, an image reading unit 13, a facsimile communication unit 14, operation panel 15, a nonvolatile memory 16, a network communication processing unit 17, and a control unit 18.

The communication device 11 is a device that is connected to the computer network 2 and is capable of communicating with other device (such as terminal device 3 or server device 4) connected to the computer network 2. A network interface card or the like can be used as the communication device 11.

The printing unit 12 is a device that can print document images based on document data generated by the image reading unit 13 or document data generated from printing data from the terminal device 3. Note that the document data represents image data having a predetermined format.

The image reading unit 13 is a device for irradiating light onto one side or both sides of an original that can be fed by an automatic document feeder (ADF) or placed by the user on the device. The unit 13 receives the reflected light thereof to read an image of the original and outputs the image as document data.

The facsimile communication unit 14 is a device including a modem, for generating a facsimile signal from the document data generated by the image reading unit 13 or document data that is generated based on printing data from the terminal device 3, transmitting and also receiving the facsimile signal via a telephone line or the like, and generating document data from the received facsimile signal. The operation panel 15 is a user interface device including a display device such as a liquid crystal display and an input device for electrically detecting a user's physical operation. The input device can be a key switch, a transparent touch panel disposed on a screen of the display device, or the like.

The nonvolatile memory (NVRAM) 16 that can serve as a storage unit is a rewritable memory to which a data area for storing count data including a count value of an occurrence of a predetermined event is allocated. An example of the storage unit is the NVRAM 16. A computer program, data necessary for an image forming processing, and the like may be stored in the NVRAM 16.

The user's ability to read/write of the count data stored in the NVRAM 16 is inhibited. That is, the read/write thereof can only be performed by the system including the control unit 18. The count data includes a user ID that functions as a user identification on a user and the count value of an event occurrence for each of predetermined one or more types of events. The predetermined one or more types of events include a one-sheet print processing, a one-sheet copy process, and/or a one-sheet facsimile transmission process. Note that instead of including the user identification information in the count data itself, the count data and the user identification information may be stored in the NVRAM 16 in association with each other. Further, a group ID that serves as identification information on the user's department or group designation may be included in the count data. In that case, the group ID is acquired from the user information 51 of the server device 4.

The network communication processing unit 17 is a processing unit for controlling the communication device 11, and performing data communication with a device connected to the computer network 2 by using a predetermined protocol. The control unit 18 is a processing unit for controlling the printing unit 12, the image reading unit 13, the facsimile communication unit 14, the operation panel 15, and the network communication processing unit 17. Further, the control unit 18, functions as a login processing unit, accesses the server device 4 to perform an authentication process for a user, and determines whether or not to permit the user to log in based on an authentication determinations. The control unit 18 further functions as a count unit, and when a predetermined event occurs based on an operation performed by the user permitted to log in (hereinafter, referred to as "login user"), updates the count data for the login user. The control unit 18 can further function as a transmission unit. When the login user logs out, the control unit 18 uses the network communication processing unit 17 to transmit the count data for the login user to the server device 4. The control unit 18 also inquires of the server device 4 as to whether or not the count data managed by the server device 4 for the login user satisfies a predetermined condition. If the count data managed by the server device 4 satisfies the predetermined condition, the user's use of a part of or all of, the functions of the image forming apparatus 1 is restricted.

The network communication processing unit 17 and the control unit 18 can be implemented by executing a computer program on a computer. The control unit 18 is an example of: the login processing unit; the count unit; the transmission unit; and the restriction unit.

The terminal device 3 is an information processing device having a network function and an authentication client function that uses the same authentication protocol as that used by the server device 4. The authentication protocol can be a Lightweight Directory Access Protocol (LDAP), Windows NT LAN Manager (NTLM), Kerberos, or the like.

The server device 4 includes a communication device 41, a server processing unit 42, and a data storage device 43.

The communication device 41 is a device that is connected to the computer network 2 and capable of communicating with other device (such as image forming apparatus 1 or terminal device 3) connected to the computer network 2. A network interface card or the like can be used as the communication device 41.

The server processing unit 42 is a processing unit for receiving a user authentication request according to a predetermined authentication protocol, and determining whether or not to authenticate the user. The server processing unit 42 can receive the count data for each user from the image forming apparatus 1, and add up the count values based on the count data. The user authentication function of the server processing unit 42 can be implemented as, for example, one of functions of a server OS (Operating System) such as Windows Server or Linux Server.

The data storage device 43 is a device for storing therein the user information 51 corresponding to each of one or more authorized users and count information 52 generated by adding up received count data. The data storage device 43 can be a device for driving a readable/writable recording medium, such as a hard disk drive or a disk array.

The user information 51 contains the authentication information used for a user authentication and personal attribute information on the user. The authentication information has attribute items, for example, a user ID and a password. The personal attribute information represents information that is not used for an authentication within the user information 51, and has attribute items, for example, an electronic mail address, a group designation (such as department or division), and a user name (user name for display). Note that the user name represents text data that is set separately from the user ID. Further, the authentication information may have only the user ID, and the authentication information may be stored in a recording medium within the terminal device 3, an IC card, or the like, and then read therefrom automatically without a user's input operation.

The count information 52 represents information generated by adding up count values of event occurrences for the respective predetermined one or more types of events, which are included in the received count data, on a user and/or group designation basis.

Figure 2:
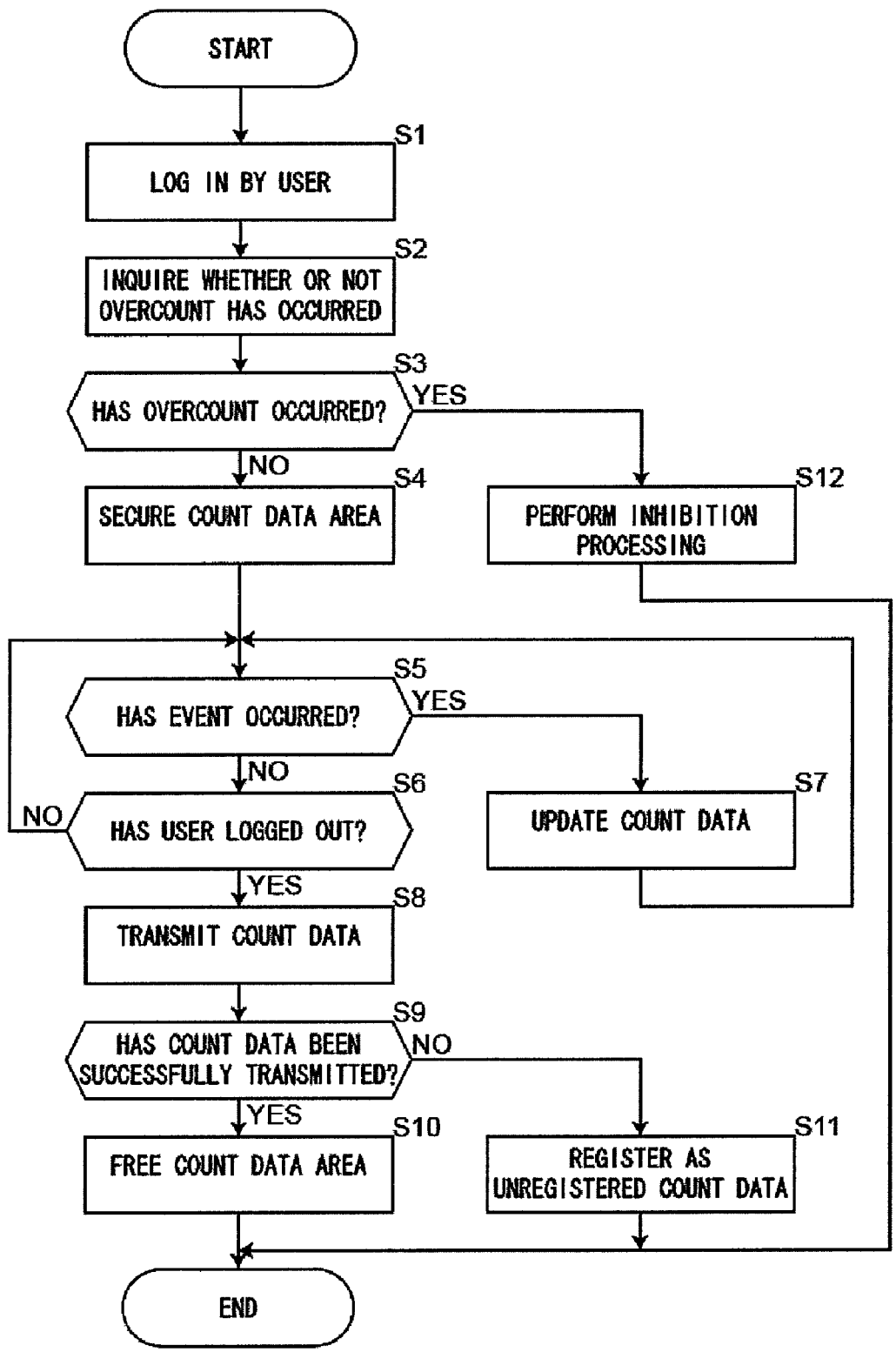
FIG. 2 is a flowchart setting forth an operation of the image forming apparatus illustrated in FIG. 1.

The summation of the count data performed in the above-mentioned system will now be described. FIG. 2 is a flowchart setting forth an operation of the image forming apparatus 1 illustrated in FIG. 1.

First, a user logs in to the image forming apparatus 1. The image forming apparatus 1 validate the user based on the validity of authentication information inputted by the user, and permits only a valid user to log in (Step S1). At this time, the authentication information including the user ID is inputted by the user through the terminal device 3 or the operation panel 15, and supplied to the control unit 18. Then, the control unit 18 uses the network communication processing unit 17 to access the server device 4, and performs an authentication process for the user. The control unit 18 permits only a user authorized by the server device 4 to log in. When a user is operating the terminal device 3, the user's operation is detected on the terminal device 3 and information such as a request based on the operation is transmitted to the image forming apparatus 1 via the computer network 2. On the image forming apparatus 1, the information is received by the network communication processing unit 17, and then supplied to the control unit 18.

A login user can use the image forming apparatus 1; on the other hand, a user that has been refused the ability to log in, cannot use the image forming apparatus 1.

The control unit 18 uses the network communication processing unit 17 to issue an inquiry to the server device 4, as to whether or not an overcount has occurred with respect to the user permitted to log in (Step S2). On the server device 4, the server processing unit 42, which has received the inquiry, references the count information 52 to perform a determination as to whether or not an overcount has occurred with respect to the user specified by the inquiry, and transmits the result of the determination as a response.

An example of a condition used for a determination of an overcount include wherein a total sum of the count values for the user has reached a predetermined upper limit value. Another example of the condition used for a determination of an overcount is one wherein the total sum of the count values based on the count data on all of users belonging to a group to which the user belongs has reached a predetermined upper limit value. Results of a determination as to whether or not an overcount has occurred may be compiled with regard to the respective predetermined one or more kinds of events, and may be transmitted as a response.

Upon reception of the results of a determination in response to the inquiry, the control unit 18 of the image forming apparatus 1 determines whether or not an overcount has occurred based on the results of the judgment (Step S3).

If an overcount has not occurred, the control unit 18 secures a count data area having a predetermined size in the NVRAM 16, and stores the count data having initial values in the count data area (Step S4). Note that the initial values of the count values of the respective kinds of events, which are included in the count data, are all set to zero.

After that, the control unit 18 monitors the occurrence of a predetermined event and when the user logs out (Steps S5 and S6). When a predetermined type of event occurs during a process performed in the printing unit 12, the image reading unit 13, facsimile communication unit 14, or the like, based on a login user's operation, the control unit 18 increments the count value of that kind of event, which is included in the count data for the login user, by 1. (Step S7).

Thus, included in the count data is a count value of an event that occurs when the login user uses the image forming apparatus 1 from the time of login until logout.

When the user logs out, the control unit 18 identifies the count data for the user who has logged out, and uses the network communication processing unit 17 to transmit the count data to the server device 4 (Step S8).

On the server device 4, the server processing unit 42, which has received the count data, transmits a response that the count data has been successfully received. After that, the server processing unit 42 can identify the user ID and/or group ID from the received count data and organizes within the received data based on the identified user ID and/or group ID. Note that if the count data does not include a group ID, the server processing unit 42 can reference the user information 51 to identify the group ID from the user ID within the count data. This increments the count value within the count information 52 by the count value within the received count data. Note that a user and/or a group upon which the count value within the count data that does not include a user ID nor a group ID is to be reflected, may be previously set forth in the setting information, such as the user information. If the count data does not include a user ID nor a group ID, based on the setting information, the server processing unit 42 may identify the user and/or the group for which the counting is to be performed. For example, in the case of a facsimile performed by the image forming apparatus 1, if the user ID or the group ID on a receiving end is not identified, the count data that does not include a user ID or a group ID is generated.

If a response to the transmission of the count data is received within a predetermined time period after the transmission, the control unit 18 of the image forming apparatus 1 determines that the transmission of the count data was successful (Step S9), and releases the count data area for the transmitted count data (Step S10).

On the other hand, if a response to the transmission of the count data is not received within the predetermined time period after the transmission, the control unit 18 determines that the transmission of the count data has failed (Step S9), sets the count data for the user as unregistered count data, and registers the user ID in an unregistered count data table (not shown) (Step S11).

Note that in a case where the count data is registered as unregistered count data, the control unit 18 may attempt a transmission to the server device 4 again after the elapse of a predetermined time period. If, at that time, the transmission is successful, the count data for the transmitted count data is released. The control unit 18 may also attempt to retransmit the count data when the same user logs out after the next login. In that case, at the time of the login, if the unregistered count data for the user exists, the unregistered count data is continuously used without a new count data area being secured. That is, the count value within the unregistered count data is not set to zero.

Further, if it is determined in Step S3 that an overcount has occurred, without securing the count data area having a predetermined size in the NVRAM 16, the control unit 18 prevents the user's use of the image forming apparatus 1 (Step S12).

As described in the above-mentioned embodiment, the server device 4 includes the user information 51, performs the user authentication via the computer network 2, receives the count data on a user basis, and adds up the count data. The control unit 18 of the image forming apparatus 1 has the functions of: determining whether or not to permit a user to log in; updating, if a predetermined event occurs based on the operation performed by the user and the count data for the user; and transmitting, when the user logs out, the count data of the user to the server device 4.

Accordingly, the count data can be centrally managed by the server device 4 in association with the user information used for the user management performed by the server device 4.

Further, according to the above-mentioned embodiment, the server device 4 includes user attribute information including, as the user information 51, the authentication information used for user authentication and identification information of the user's group designation, receives the count data for a plurality of users, and adds up the count data on a group designation basis. Examples of the group designation to be used include the department to which the user belongs within a corporation.

Accordingly, the count data can be centrally managed by the server device 4 in association with the identification information on the group designation within the user information 51.

Further, since the count data is added up for each user that has logged in, in a case where the image forming apparatus 1 is provided for each department, even if a given user uses the image forming apparatus 1 other than that of the user's department, the counting is performed with respect to the user's department.

Further, according to the above-mentioned embodiment, the count data area of the NVRAM 16 is secured in the storage unit after the user is permitted to log in. The data is released after successful transmission of the count data after the user logs out.

Accordingly, the data area to be secured in the NVRAM 16 is reduced, which makes it possible to have a reduced capacity of nonvolatile memory. Further, since the count data area is released after the successful transmission of the count data, it is possible to prevent the count data from being lost where there is a failure in the transmission of the count data or the like.

Note that the above-mentioned embodiment is an example of the present invention, but the present invention is not limited thereto, and various modifications and changes can be made within a scope that does not depart from the gist of the present invention.

For example, a plurality of image forming apparatuses 1 may be connected to the computer network 2. In addition, the respective image forming apparatuses 1, each of which exists in each of a plurality of departments, may be connected to the computer network 2.

Further, if an overcount occurs only for a part of an event, the process of Steps S4 to S11 is executed. However, the use of the function of the image forming apparatus 1 corresponding to an event for which the overcount has occurred is prevented by, for example, disabling an operation through an operation button corresponding to the function.

Further, in the above-mentioned embodiment, the server device 4 may separately include a server device for performing the user authentication and a server device for summing up the count data.

Further, in the above-mentioned embodiment, the user ID and the group ID included in the count data may be a digest of the original user ID and the original group ID. The digest is set as a hash function value of the original IDs. This can reduce the count data in size.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system, comprising:
    a server device comprising user information, for performing a user authentication via a computer network and for receiving and adding up count data on a user basis; and
    an image forming apparatus comprising:
    a storage unit to which a data area for storing therein the count data including a count value of an occurrence of a predetermined event can be allocated;
    a login processing unit for determining whether to permit a user to log in;
    a count unit for updating, when the predetermined event occurs based on an operation performed by the user, the count data for the user; and
    a transmission unit for transmitting, when the user logs out, the count data for the user to the server device;
    wherein,
    the storage unit further comprises a nonvolatile memory, capable of storing the count data and user identification information in association with each other;
    the data area is secured in the storage unit after the user is permitted to log in, and is released after successful transmission of the count data after the user logs out;
    when the transmission of the count data fails, the count data is set as unregistered count data; and
    the unregistered count data is retransmitted when the same user logs out after the next login, and at the time of the next login, if the unregistered count data exists, the unregistered count data is continuously used without the new count data area.

2. An image forming system according to claim 1, wherein the count data comprises: user identification information; and the count value of an event occurrence for each of the predetermined events.

3. An image forming system according to claim 2, wherein the user identification information is selected from the group consisting of a user ID and a group ID.

4. An image forming system according to claim 2, wherein the user identification information is selected from the group consisting of a hash function value of a user ID and a hash function value of a group ID.

5. An image forming system according to claim 2, wherein the predetermined events comprise an event selected from the group consisting of a one-sheet print processing, a one-sheet copy processing, and a one-sheet facsimile transmission processing.

6. An image forming system according to claim 1, wherein the server device includes user authentication information and user attribute information as the user information, receives the count data for a plurality of users, and adds up the count data on a user attribute basis.

7. An image forming system according to claim 1, wherein the server device receives a user authentication request according to a predetermined authentication protocol, and determines whether or not to authenticate a user.

8. An image forming system according to claim 7, wherein the predetermined authentication protocol is selected from the group consisting of Lightweight Directory Access Protocol (LDAP), Windows NT LAN Manager (NTLM), and Kerberos.

9. An image forming system according to claim 6, wherein the user authentication information is information used for the user authentication, and represents an attribute item selected from the group consisting of a user ID and a password.

10. An image forming system according to claim 6, wherein the user attribute information is information that is not used for the user authentication, and is selected from the group consisting of an electronic mail address, a belonging group, and a user name.

11. An image forming system, comprising:
a first server device including user information, for performing a user authentication via a computer network;
a second server device for receiving and adding up count data on a user basis; and
an image forming apparatus comprising:
a storage unit to which a data area for storing therein the count data including a count value of an occurrence of a predetermined event can be allocated;
a login processing unit for determining whether to permit a user to log in;
a count unit for updating, when the predetermined event occurs based on an operation performed by the user, the count data for the user; and
a transmission unit for transmitting, when the user logs out, the count data for the user to the second server device;
wherein,
the storage unit further comprises a nonvolatile memory, capable of storing the count data and user identification information in association with each other;
the data area is secured in the storage unit after the user is permitted to log in, and is released after successful transmission of the count data after the user logs out;
when the transmission of the count data fails, the count data is set as unregistered count data; and
the unregistered count data is retransmitted when the same user logs out after the next login, and at the time of the next login, if the unregistered count data exists, the unregistered count data is continuously used without the new count data area.

12. An image forming apparatus for transmitting count data to a server device for managing the count data including a count value of an occurrence of a predetermined event, comprising:
a storage unit to which a data area for storing therein the count data including the count value of the occurrence of the predetermined event can be allocated;
a login processing unit for determining whether to permit a user to log in;
a count unit for updating, when the predetermined event occurs based on an operation performed by the user, the count data for the user; and
a transmission unit for transmitting, when the user logs out, the count data for the user to the server device;
wherein,
the storage unit further comprises a nonvolatile memory, capable of storing the count data and user identification information in association with each other;
the data area is secured in the storage unit after the user is permitted to log in, and is released after successful transmission of the count data after the user logs out;
when the transmission of the count data fails, the count data is set as unregistered count data; and
the unregistered count data is retransmitted when the same user logs out after the next login, and at the time of the next login, if the unregistered count data exists, the unregistered count data is continuously used without the new count data area.

13. An image forming apparatus according to claim 12, wherein the count data comprises: user identification information; and the count value of an event occurrence for each of predetermined one or more kinds of events.

14. An image forming apparatus according to claim 13, wherein the predetermined events is selected from the group consisting of a one-sheet print processing, a one-sheet copy processing, and a one-sheet facsimile transmission processing.

15. An image forming apparatus according to claim 12, comprising a restriction unit for issuing, after the user is permitted to log in, an inquiry to the server device as to whether or not the count data managed by the server device for the user satisfies a predetermined condition, and if the count data satisfies the predetermined condition, restricting the user's use of at least a part of functions of the image forming apparatus.

16. An image forming apparatus according to claim 15, wherein the predetermined condition is a condition that a total sum of count values based on the count data of the user has reached a predetermined upper limit value.

17. An image forming apparatus according to claim 15, wherein the predetermined condition is a condition that a total sum of count values based on the count data on all of users belonging to a group to which the user belongs has reached a predetermined upper limit value.

18. An image forming system, comprising:
a server for performing a user authentication and receiving and adding up count data on a user basis; and
an image forming apparatus comprising: a storage unit to which a data area for storing therein the count data, a login processing unit for determining whether to permit a user to log in, a count unit for updating, when a predetermined event occurs based on an operation performed by the user, the count data for the user, and a transmission unit for transmitting, when the user logs out, the count data for the user to the server;
wherein,
the storage unit further comprises a nonvolatile memory, capable of storing the count data and user identification information in association with each other;
the data area is secured in the storage unit after the user is permitted to log in, and is released after successful transmission of the count data after the user logs out;
when the transmission of the count data fails, the count data is set as unregistered count data; and
the unregistered count data is retransmitted when the same user logs out after the next login, and at the time of the next login, if the unregistered count data exists, the unregistered count data is continuously used without the new count data area.

19. An image forming system, comprising:
a first server for performing a user authentication via a computer network;
a second server for receiving and adding up count data on a user basis; and
an image forming apparatus comprising: a storage unit to which a data area for storing therein the count data, a login processing unit for determining whether to permit a user to log in, a count unit for updating, when a predetermined event occurs based on an operation performed by the user, the count data for the user, and a transmission unit for transmitting, when the user logs out, the count data for the user to the second server;

wherein, the storage unit further comprises a nonvolatile memory, capable of storing the count data and user identification information in association with each other;

the data area is secured in the storage unit after the user is permitted to log in, and is released after successful transmission of the count data after the user logs out;

when the transmission of the count data fails, the count data is set as unregistered count data; and the unregistered count data is retransmitted when the same user logs out after the next login, and at the time of the next login, if the unregistered count data exists, the unregistered count data is continuously used without the new count data area.

20. An image fanning apparatus comprising:

a storage unit for storing therein count data including a count value of an occurrence of a predetermined event;

a login processing unit for determining whether to permit a user to log in;

a count unit for updating, when the predetermined event occurs based on an operation performed by the user, the count data for the user; and a transmission unit for transmitting, when the user logs out, the count data wherein, the storage unit further comprises a nonvolatile memory, capable of storing the count data and user identification information in association with each other;

the data area is secured in the storage unit after the user is permitted to log in, and is released after successful transmission of the count data after the user logs out;

when the transmission of the count data fails, the count data is set as unregistered count data; and the unregistered count data is retransmitted when the same user logs out after the next login, and at the time of the next login, if the unregistered count data exists, the unregistered count data is continuously used without the new count data area.

* * * * *